US008513832B2

(12) United States Patent
Hunter et al.

(10) Patent No.: US 8,513,832 B2
(45) Date of Patent: Aug. 20, 2013

(54) POWER SUPPLY UNIT

(75) Inventors: Stephen John Hunter, Randpark Extension (ZA); Andre Malan Joubert, Edenvale (ZA)

(73) Assignee: IPS Group Inc., Rancho Santa Fe, CA (US)

( * ) Notice: Subject to any disclaimer, the term of this patent is extended or adjusted under 35 U.S.C. 154(b) by 300 days.

(21) Appl. No.: 12/059,909

(22) Filed: Mar. 31, 2008

(65) Prior Publication Data

US 2009/0026842 A1 Jan. 29, 2009

Related U.S. Application Data

(60) Provisional application No. 60/909,209, filed on Mar. 30, 2007.

(51) Int. Cl.
*H02J 9/00* (2006.01)
*H02J 7/00* (2006.01)
*G07F 9/10* (2006.01)

(52) U.S. Cl.
USPC .............................. 307/66; 194/350; 320/110

(58) Field of Classification Search
USPC .............................. 307/66; 194/350; 320/110
See application file for complete search history.

(56) References Cited

U.S. PATENT DOCUMENTS

| 2,161,046 | A | 6/1939 | Hitzeman |
| 2,832,506 | A | 4/1958 | Hatcher |
| 2,988,191 | A | 6/1961 | Grant |
| 4,812,805 | A | 3/1989 | Lachat et al. |
| 4,823,928 | A | 4/1989 | Speas |
| 4,825,425 | A | 4/1989 | Turner |
| 4,875,598 | A | 10/1989 | Dahl |
| 4,880,097 | A | 11/1989 | Speas |
| 5,065,156 | A | 11/1991 | Bernier |
| 5,222,076 | A | 6/1993 | Ng et al. |

(Continued)

FOREIGN PATENT DOCUMENTS

| CA | 2377010 | 12/2001 |
| EP | 0980055 | 2/2000 |

(Continued)

OTHER PUBLICATIONS

Unpublished U.S. Appl. No. 13/786,387, filed Mar. 5, 2013, King.

(Continued)

*Primary Examiner* — Hal Kaplan
(74) *Attorney, Agent, or Firm* — Wilson, Sonsini, Goodrich & Rosati

(57) ABSTRACT

A power supply unit for supplying power to a device has a rechargeable, main battery; a charging arrangement for charging the main battery; a non-rechargeable back-up battery; load terminals for connection to a load; and a control unit for controlling supply of power to the load primarily from the main battery and secondarily from the back-up battery. The device is, in particular, a single bay, stand alone parking meter. In the event that the main battery runs low, the control unit is configured to supply power to the load from both the main battery and the back-up battery or only from the back-up battery. The back-up battery is easily replaceable, and the power supply unit has a bay, with connectors for receiving the back-up battery. The main battery is charged from solar panels. A communication device is provided to communicate status messages wirelessly to a control system.

22 Claims, 4 Drawing Sheets

(56) References Cited

U.S. PATENT DOCUMENTS

| | | | |
|---|---|---|---|
| 5,244,070 A | 9/1993 | Carmen et al. | |
| 5,273,151 A | 12/1993 | Carmen et al. | |
| 5,360,095 A | 11/1994 | Speas | |
| 5,442,348 A | 8/1995 | Mushell | |
| 5,563,491 A | 10/1996 | Tseng | |
| 5,614,892 A | 3/1997 | Ward, II et al. | |
| 5,617,942 A | 4/1997 | Ward et al. | |
| 5,648,906 A | 7/1997 | Amirpanahi | |
| 5,659,306 A | 8/1997 | Bahar | |
| 5,806,651 A | 9/1998 | Carmen et al. | |
| 5,833,042 A | 11/1998 | Baitch et al. | |
| 5,841,369 A | 11/1998 | Sutton et al. | |
| 5,842,411 A | 12/1998 | Johnson | |
| 5,852,411 A | 12/1998 | Jacobs et al. | |
| 5,954,182 A | 9/1999 | Wei | |
| 6,111,522 A | 8/2000 | Hiltz et al. | |
| 6,116,403 A | 9/2000 | Kiehl | |
| 6,195,015 B1 | 2/2001 | Jacobs et al. | |
| 6,229,455 B1 | 5/2001 | Yost et al. | |
| 6,230,868 B1 | 5/2001 | Tuxen et al. | |
| 6,309,098 B1 | 10/2001 | Wong | |
| 6,312,152 B2 | 11/2001 | Dee et al. | |
| 6,456,491 B1 | 9/2002 | Flannery et al. | |
| 6,457,586 B2 | 10/2002 | Yasuda et al. | |
| 6,505,774 B1 | 1/2003 | Fulcher et al. | |
| 6,747,575 B2 | 6/2004 | Chauvin et al. | |
| 6,856,922 B1* | 2/2005 | Austin et al. | 702/63 |
| 6,914,411 B2* | 7/2005 | Couch et al. | 320/101 |
| 6,929,179 B2* | 8/2005 | Fulcher et al. | 235/381 |
| 7,019,420 B2* | 3/2006 | Kogan et al. | 307/150 |
| 7,183,999 B2 | 2/2007 | Matthews et al. | |
| 7,222,031 B2* | 5/2007 | Heatley | 702/63 |
| 7,237,716 B2 | 7/2007 | Silberberg | |
| 7,388,349 B2* | 6/2008 | Elder et al. | 320/104 |
| 7,748,620 B2 | 7/2010 | Gomez et al. | |
| 7,772,720 B2* | 8/2010 | McGee et al. | 307/66 |
| 7,854,310 B2 | 12/2010 | King et al. | |
| 7,855,661 B2 | 12/2010 | Ponert | |
| 2001/0012241 A1 | 8/2001 | Dee et al. | |
| 2001/0047278 A1 | 11/2001 | Brookner et al. | |
| 2001/0051531 A1 | 12/2001 | Singhai et al. | |
| 2003/0092387 A1 | 5/2003 | Hjelmvik | |
| 2003/0112597 A1 | 6/2003 | Smith | |
| 2003/0121754 A1 | 7/2003 | King | |
| 2003/0128010 A1* | 7/2003 | Hsu | 320/101 |
| 2003/0128136 A1 | 7/2003 | Spier et al. | |
| 2003/0140531 A1 | 7/2003 | Pippins | |
| 2003/0144972 A1 | 7/2003 | Cordery et al. | |
| 2003/0179107 A1 | 9/2003 | Kibria et al. | |
| 2004/0068434 A1 | 4/2004 | Kanekon | |
| 2004/0084278 A1 | 5/2004 | Harris et al. | |
| 2004/0181496 A1 | 9/2004 | Odinotski et al. | |
| 2004/0264302 A1 | 12/2004 | Ward | |
| 2005/0178639 A1 | 8/2005 | Brumfield et al. | |
| 2005/0192911 A1 | 9/2005 | Mattern | |
| 2006/0021848 A1 | 2/2006 | Smith | |
| 2006/0116972 A1 | 6/2006 | Wong | |
| 2006/0149684 A1 | 7/2006 | Matsura et al. | |
| 2006/0152349 A1 | 7/2006 | Ratnakar | |
| 2006/0267799 A1 | 11/2006 | Mendelson | |
| 2007/0016539 A1 | 1/2007 | Groft et al. | |
| 2007/0094153 A1 | 4/2007 | Ferraro | |
| 2007/0114849 A1* | 5/2007 | Falik et al. | 307/64 |
| 2007/0119682 A1* | 5/2007 | Banks et al. | 194/239 |
| 2007/0136128 A1 | 6/2007 | Janacek et al. | |
| 2008/0071611 A1 | 3/2008 | Lovett | |
| 2008/0093454 A1 | 4/2008 | Yamazaki et al. | |
| 2008/0238715 A1 | 10/2008 | Cheng et al. | |
| 2008/0245638 A1 | 10/2008 | King et al. | |
| 2009/0032368 A1 | 2/2009 | Hunter et al. | |
| 2009/0095593 A1 | 4/2009 | King et al. | |
| 2009/0109062 A1 | 4/2009 | Song | |
| 2009/0159674 A1 | 6/2009 | William et al. | |
| 2009/0183966 A1 | 7/2009 | King et al. | |
| 2009/0192950 A1 | 7/2009 | King et al. | |
| 2009/0284907 A1 | 11/2009 | Regimbal et al. | |
| 2011/0057815 A1 | 3/2011 | King et al. | |
| 2011/0060653 A1 | 3/2011 | King et al. | |
| 2011/0203901 A1 | 8/2011 | King et al. | |
| 2013/0027218 A1 | 1/2013 | Schwarz et al. | |

FOREIGN PATENT DOCUMENTS

| | | | |
|---|---|---|---|
| FR | 2837583 | * | 9/2003 |
| JP | 2002-099640 | | 4/2002 |
| JP | 2005-267430 | | 9/2005 |
| KR | 10-2005-0038077 | | 4/2005 |
| WO | WO-2006-095352 | | 9/2006 |
| WO | WO2006095352 | * | 9/2006 |
| WO | WO-2009-154787 | | 12/2009 |

OTHER PUBLICATIONS

Cell Net Data Systems, "First Wirless Monitoring of Parking Meters Results in Theft Arrests Using CellNet Data Systems Technology," PRNewswire, May 11, 1992, 2 pgs.

Flatley, "In San Francisco, Hackers Park for Free," Read filed under Misc. Gadgets, downloaded from www.engadget.com website on May 3, 2010, originally posted on Jul. 31, 2009, 5 pages.

Meter Solutions, Single-Space Meters brochure, downloaded from www.duncansolutions.com website, revised Apr. 2006, 2 pages.

PCT/IB2006/054574 International Preliminary Report on Patentability dated Mar. 10, 2009.

PCT/IB2006/054574 International Search Report dated Oct. 27, 2008.

PCT/US2010/047906 International Preliminary Report on Patentability dated Mar. 6, 2012.

PCT/US2010/047906 International Search Report dated Mar. 30, 2011.

PCT/US2010/047907 International Preliminary Report on Patentability dated Mar. 15, 2012.

PCT/US2010/047907 International Search Report dated Apr. 26, 2011.

PCT/US2012/048190 International Search Report dated Jan. 22, 2013.

* cited by examiner

POWER SUPPLY UNIT

This application claims the benefit of U.S. Provisional Application No. 60/909,209, filed Mar. 30, 2007, by Hunter et al., entitled POWER SUPPLY UNIT, which is incorporated in its entirety herein by reference.

FIELD OF THE INVENTION

THIS INVENTION relates to a power supply unit and to a device, in particular a single bay parking meter, having the power supply unit.

SUMMARY OF THE INVENTION

According to the invention, there is provided a power supply unit for supplying power to a device, the power supply unit including
  a rechargeable, main battery;
  a charging arrangement for charging the main battery;
  a set of connectors for connection to a back-up battery;
  a set of load terminals for connection to a load; and
  a control unit for controlling supply of power to the load primarily from the main battery and secondarily from the back-up battery.

In an embodiment of the invention the power supply unit has the main battery and the back-up battery. The back-up battery is preferably non-rechargeable.

It will be appreciated that power is taken, in use, from the backup battery in the event that the main battery is inadequate.

Further according to the invention there is provided a device, in particular a parking meter, which has a power supply unit in accordance with the invention.

In the event that the main battery runs low, the control unit is configured to supply power to the load from both the main battery and the back-up battery or only from the back-up battery In a preferred embodiment, the back-up battery is easily replaceable. In this embodiment, the power supply unit has a bay for receiving the back-up battery and the connectors are spaced and are such as to permit easy removal and replacement of the back-up battery.

In another embodiment of the invention, the power supply unit further includes a communication device, for communicating messages to a control system. Such messages are selected from the group consisting of: notification that the main battery has been insufficiently recharged, and a notification that power is being supplied from the backup battery.

In a further embodiment of the invention, the communication device may be operable in a wireless manner, and utilises a cellular telephone network. Thus, with this embodiment, the communication device may have a cellular telephone module.

In an embodiment of the invention, the charging arrangement includes charging terminals for connecting the unit to a solar panel. The device then incorporates the solar panel.

It will be appreciated that in normal operation power is supplied only from the main battery. However, if the main battery is insufficiently recharged, or it is unable to supply the power required by the load, then supplementary power is supplied, partially or totally, from the backup battery, as determined by the control unit.

Preferably, the nominal supply voltage of the backup battery is slightly greater than that of the main battery.

BRIEF DESCRIPTION OF THE DRAWINGS

Embodiments of the invention is now described, by way of example only and without limiting the scope of the invention, with reference to the accompanying figures, wherein.

DETAILED DESCRIPTION

Figure 1:
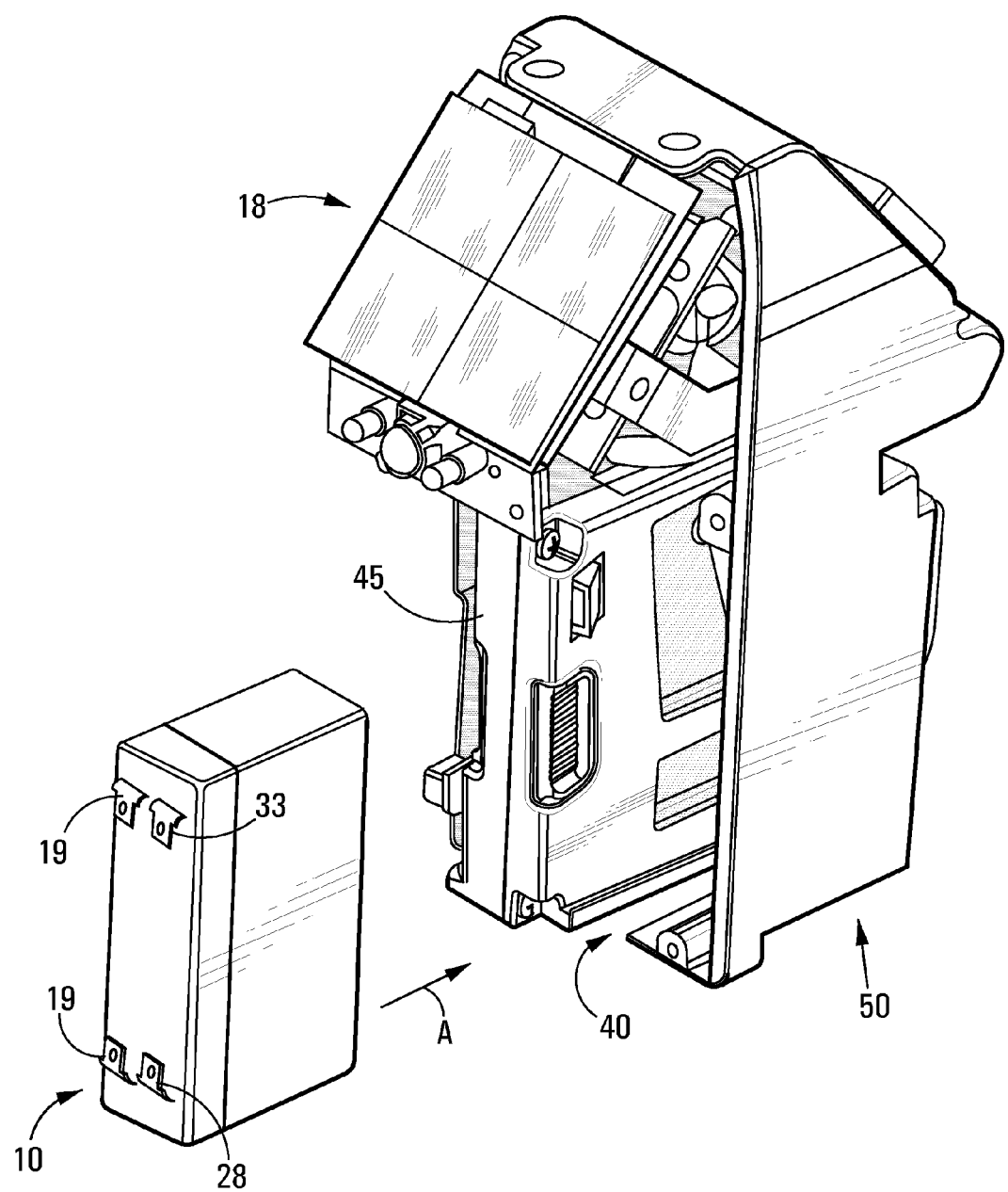
FIG. 1 is an isometric view of a power supply unit in accordance with the invention, shown in alignment with part of a parking meter body.

In the accompanying figures, the power supply unit is generally designated by reference numeral 10 and comprises a rechargeable, main battery 12, a charging arrangement in the form of a diode 34 for charging the main battery 12, a replaceable back-up battery 14, load terminals 19 and a control unit 16 for controlling supply of power to a load 20 connected via the load terminals 19 primarily from the main battery 12 and secondarily from the back-up battery 14 in the event that the main battery 12 is inadequate. The power supply unit 10 further has a solar panel terminal 33 and an auxiliary charging terminal 28.

Figure 3:
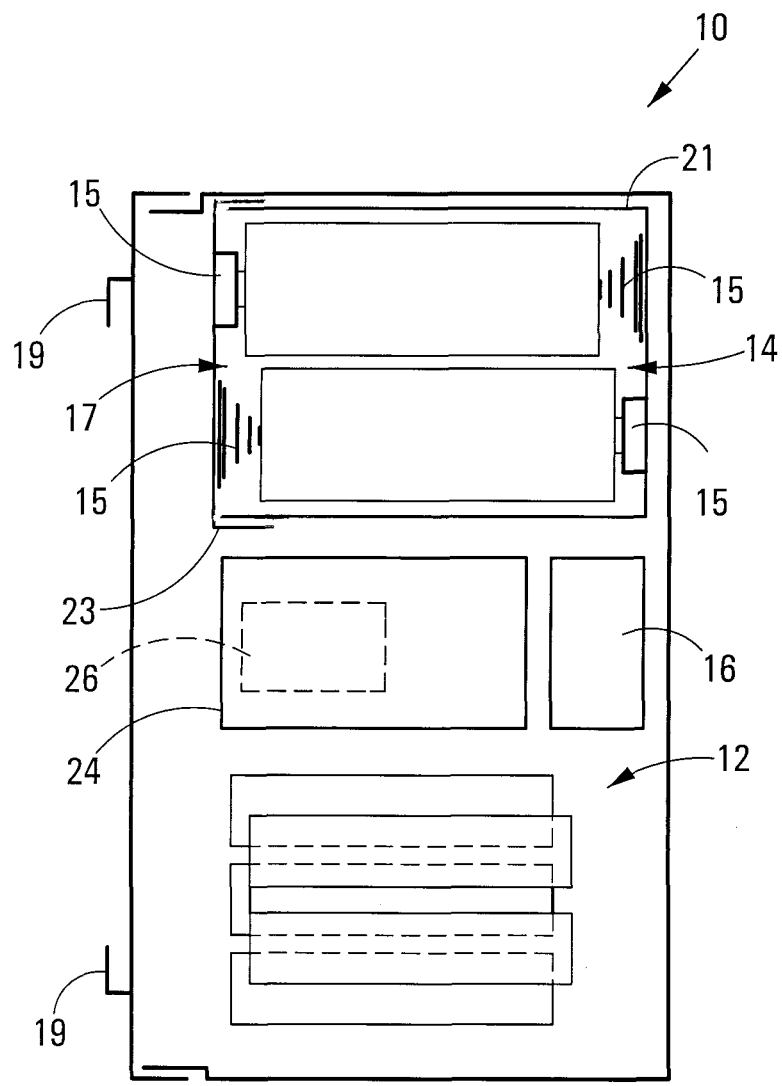
FIG. 3 is a schematic sectioned view of the power supply unit.
Figure 4:
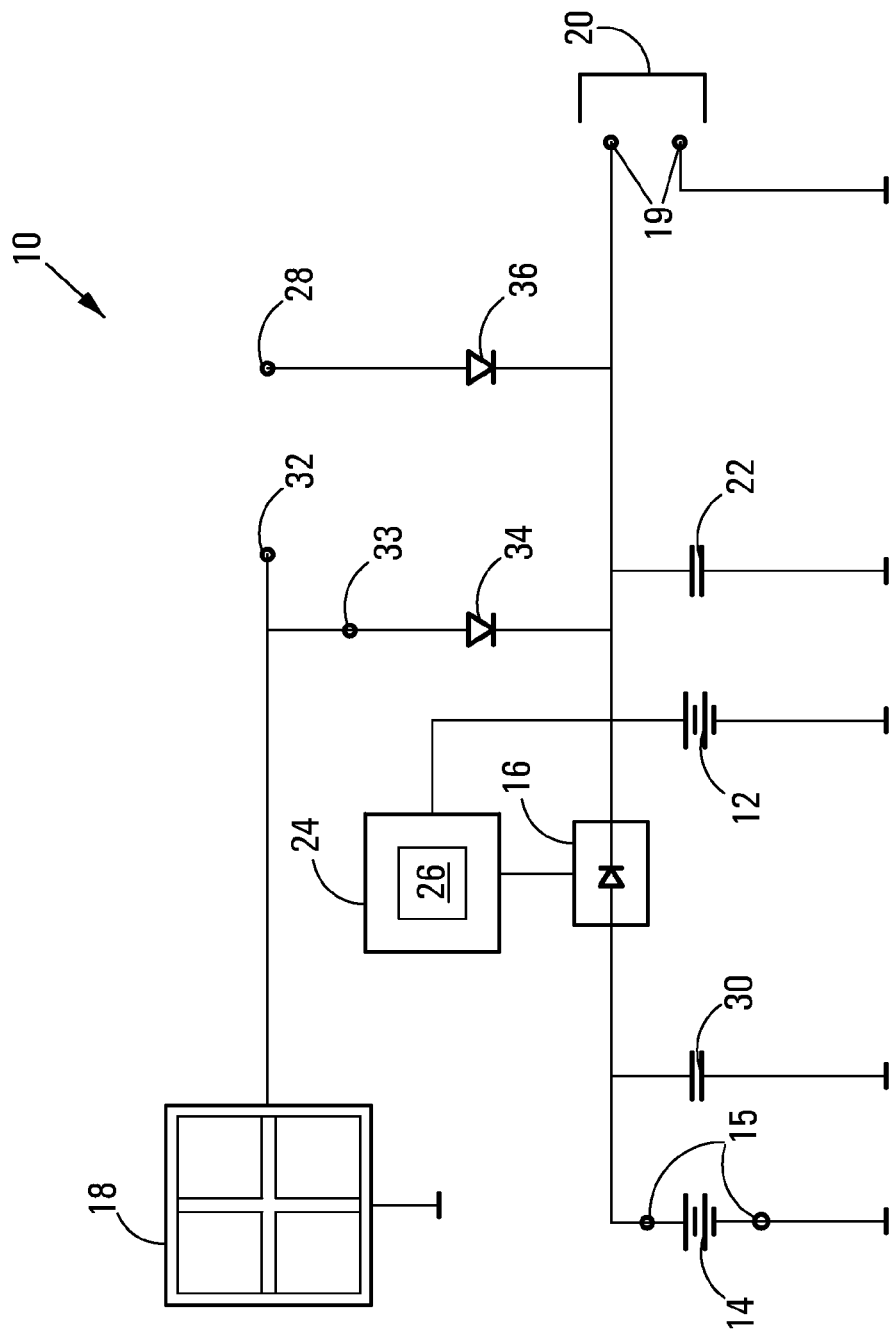
FIG. 4 is a circuit diagram of the power supply unit.

The power supply unit 10 further includes a bay 17 which contains the replaceable backup battery 14. The bay 17 is illustrated in FIG. 3, where it is seen to be defined by a compartment 21 with a lid 23 within the power supply unit 10. The bay 17 has spaced connectors 15 for the backup battery 14. Also shown in FIG. 3 is a communication device 24 with a cellular telephone module 26.

More specifically, in a preferred embodiment of the invention, the main battery 12 comprises an arrangement of five "AA" size nickel cadmium rechargeable cells, which cells are coupled to each other and recharged by solar panels 18 via the solar panel terminal 33. The backup battery 14 comprises a coupled arrangement of two non-rechargeable, disposable "C" size lithium-thionyl chloride cells, and the control unit 16 is a conventional linear, low dropout control unit, known in the trade as the Linear Technology™ model LT1529-5. The control unit 16 controls the supply of power to the load 20 from the main battery 12 and the backup battery 14, in the manner described below.

Figure 2:
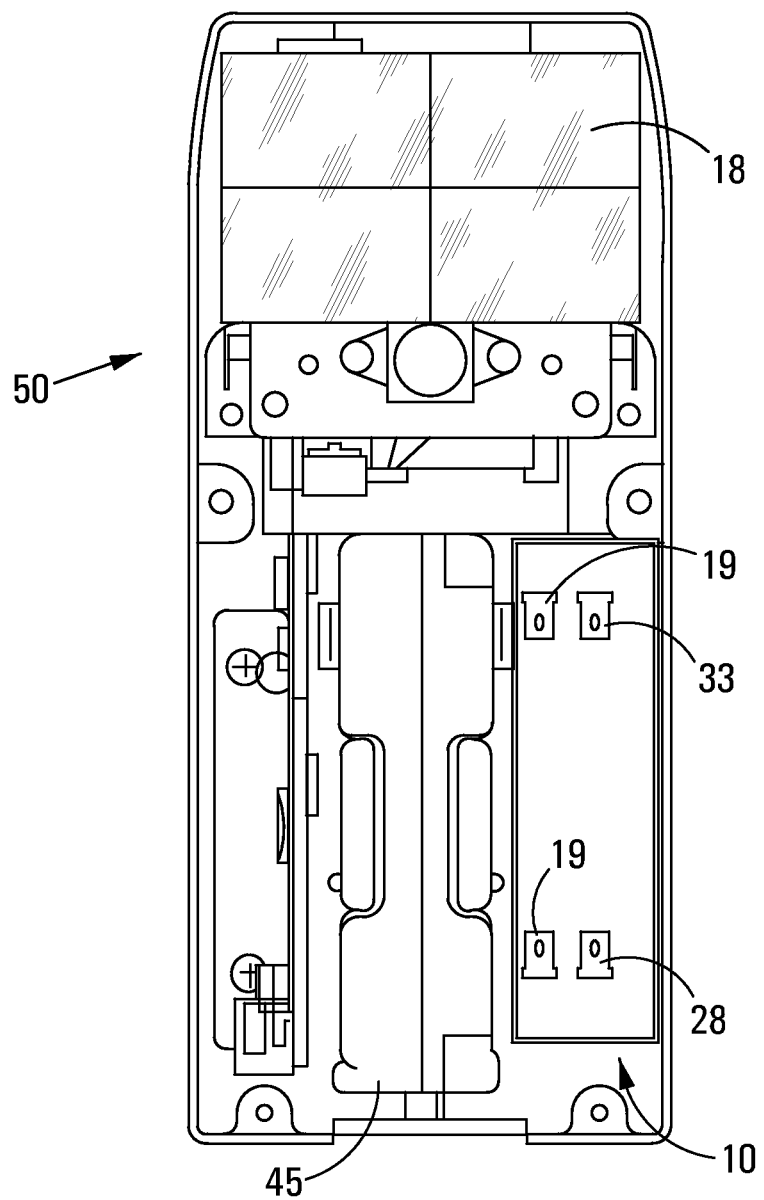
FIG. 2 is a rear view of the part of the parking meter body, depicting the power supply unit when inserted fully therein.

It is not only the power supply unit 10 itself that is the subject of this invention. This invention extends to include a device, in particular a single bay stand alone parking meter 50, having the power supply unit 10 as described above. This is illustrated in FIGS. 1 and 2, in which FIG. 1 depicts the power supply unit 10 aligned for insertion into a complementary dimensioned and configured recess 40 within parking meter 50. The power supply unit 10 is moved into position, in the direction of arrow "A", to fit snugly within the recess 40, as is depicted in FIG. 2. A coin validation unit 45 of the parking meter 50 is not a part of the present invention, but is mentioned for completeness, since the validation unit 45, and other components, such as a timer and a display (not shown) are powered by the power supply unit 10, being connected thereto via the load terminals 19. The parking meter 50 has the solar panels 18 which are connected to the solar panel terminal 33.

The power supply unit 10 is operated as follows. Under favourable conditions, with the main battery 12 being sufficiently charged and with the voltage across the main battery 12 being greater than a predetermined threshold value, the control unit 16 is configured to permit only the main battery 12 to supply power to the load 20. Conversely, under unfavourable conditions, when the main battery is not sufficiently charged, the supply voltage of the main battery 12 is lower than the threshold value, and in such conditions, the control unit 16 is configured to permit power to be supplied also, or only, from the backup battery 14 to the load. It will be appreciated that, in this way, use of the backup battery 14 occurs only when strictly necessary, namely when the voltage across the main battery 12 falls below a predetermined level.

In the particular instance where the power supply unit 10 is for a stand alone parking meter, the nominal supply voltage of the main battery 12 is 6.0V and of the back-up battery 14 7.2V. The control unit 16 is configured to permit power to be supplied from the backup battery 14 when the voltage across the main battery 12 measures 5.5 V or less.

Capacitor 30 is provided to assist during peak power demand and capacitor 22 assists with stability of the regulator 16 and with peak power demand. In alternative embodiments of the invention, a further, external recharging source, such as a portable charger, may be connected via terminal 28. It will be appreciated that the extent of reliance on the backup battery 14 to supply current to circuit 20, is minimised. This, in turn, extends the lifespan of the backup battery 14.

The power supply unit 10 further includes diodes 34 and 36, which serve to prevent reverse current from flowing into the solar panels 18 and an external auxiliary recharging source via terminal 28 respectively.

The communication device 24 communicates notifications to a control system (not shown). Typically, such notifications relate to the state of the main battery 12 and of the backup battery 14. Notifications that are communicated are that the voltage across the main battery 12 has fallen below the predetermined minimum level, and that power is being supplied from the backup battery 14. The communication device 24 communicates these notifications in a wireless manner across a telecommunications network via the cellular telephone module 26.

It will be appreciated by the person skilled in the art that application of this invention is not limited to parking meters only, but that this invention also has application to a multitude of power supply units used to supply current to electrical circuits.

What is claimed is:

1. A power supply unit for supplying power to a parking meter, the power supply unit including
    a rechargeable, main battery;
    a charging arrangement for charging the main battery;
    a set of connectors for a back-up battery;
    a wireless communication device for communicating a status message regarding the state of the main battery and the state of the back-up battery to a control system external to the parking meter;
    a set of load terminals for connection to a load;
    a control unit for controlling supply of power to the load primarily from the main battery and secondarily from the back-up battery; and
    a housing that encloses the main battery, the back-up battery, the control unit, and the wireless communication device;
    wherein the housing includes the load terminals and is received within the parking meter.

2. A power supply unit for supplying power to a device as claimed in claim 1, in which the control unit is configured to supply power, in use, to the load from both the main battery and the back-up battery when the main battery is discharged to a predetermined extent.

3. A power supply unit for supplying power to a device as claimed in claim 1, in which the control unit is configured to supply power, in use, to the load from only the back-up battery when the main battery is discharged to a predetermined extent.

4. A power supply unit for supplying power to a device as claimed in claim 1, in which the back-up battery is replaceable.

5. A power supply unit for supplying power to a device as claimed in claim 4, which has a bay for receiving the back-up battery and the set of connectors are located in the bay.

6. A power supply unit for supplying power to a device as claimed in claim 1, in which the status message is selected from the group consisting of a notification that the main battery has been insufficiently recharged and a notification that power is being supplied from the back-up battery.

7. A power supply unit for supplying power to a device as claimed in claim 1, in which the communication device includes a cellular telephone module.

8. A power supply unit for supplying power to a device as claimed in claim 1, which includes a solar panel terminal for connecting the charging arrangement to a solar panel.

9. A device which has a power supply unit for supplying power to it as claimed in claim 8, which has a solar panel that is connected to the solar panel terminal.

10. A power supply unit for supplying power to a device as claimed in claim 8, wherein the power supply unit further includes a diode coupled to the solar panel to prevent reverse current from flowing into the solar panel.

11. A power supply unit for supplying power to a device as claimed in claim 1, in which the nominal supply voltage of the back-up battery is slightly greater than that of the main battery.

12. A power supply unit for supplying power to a device as claimed in claim 1, in which the back-up battery is non-rechargeable.

13. A device as claimed in claim 1, which is a single bay parking meter.

14. A power supply unit for supplying power to a device as claimed in claim 1, wherein the communication device is configured to communicate battery status information to an external device over a telecommunications network.

15. A power supply unit as claimed in claim 1, wherein the power supply unit further includes:
    a first capacitor connected in parallel with the main battery to assist the main battery during peak power demand to supply the load with power; and
    a second capacitor connected in parallel with the back-up battery to assist the back-up battery during peak power demand to supply the load with power.

16. A power supply unit for supplying power to a device as claimed in claim 15, wherein the first capacitor of the power supply unit is recharged by a solar panel.

17. A parking meter comprising:
    a parking meter housing;
    a solar panel;
    a power supply unit for supplying electrical power, the power supply unit including
        a rechargeable, main battery,
        a charging arrangement for charging the main battery,
        a set of connectors for a back-up battery,
        a wireless communication device for communicating a status message regarding the state of the main battery and the state of the back-up battery from the power supply unit to a control system external to the parking meter, a solar panel terminal for connecting the charging arrangement to the solar panel, a set of load terminals for connection to a load, a control unit for controlling supply of power to the load primarily from the main battery and secondarily from the back-up battery, and a housing that encloses the main battery, the back-up battery, the control unit, and the wireless communication device, wherein the housing of the power supply unit includes the load terminals and is received within the parking meter housing.

18. A parking meter as claimed in claim 17, the parking meter further including a coin validation unit that receives power from the power supply unit.

19. A parking meter as claimed in claim 17, wherein the communication device is configured to communicate battery status information to an external device over a telecommunications network.

20. A parking meter as claimed in claim 17, wherein the power supply unit further includes a diode coupled to the solar panel to prevent reverse current from flowing into the solar panel.

21. A parking meter as claimed in claim 17, wherein the power supply unit further includes:

a first capacitor connected in parallel with the main battery to assist the main battery during peak power demand to supply the load with power; and a second capacitor connected in parallel with the back-up battery to assist the back-up battery during peak power demand to supply the load with power.

22. A parking meter as claimed in claim 21, wherein the first capacitor of the power supply unit is recharged by the solar panel.

* * * * *